United States Patent [19]
Auclair et al.

[11] Patent Number: 5,932,655
[45] Date of Patent: Aug. 3, 1999

[54] WEATHERABLE RESINOUS COMPOSITION HAVING IMPROVED OPACITY AND IMPACT STRENGTH

[75] Inventors: Richard M. Auclair, Westfield, Mass.; Moh Ching Oliver Chang, Leverkusen, Germany

[73] Assignee: Bayer Corporation, Pittsburgh, Pa.

[21] Appl. No.: 08/974,541

[22] Filed: Nov. 19, 1997

[51] Int. Cl.$^6$ .................................................. C08G 63/48
[52] U.S. Cl. ............................................................. 525/71
[58] Field of Search ................................................ 525/71

[56] References Cited

U.S. PATENT DOCUMENTS

| | | | |
|---|---|---|---|
| 3,055,859 | 9/1962 | Vollmert | 260/45.5 |
| 3,691,260 | 9/1972 | Mittnacht et al. | 260/876 R |
| 4,224,419 | 9/1980 | Swoboda et al. | 525/71 |
| 4,753,988 | 6/1988 | Henton | 525/71 |
| 5,270,387 | 12/1993 | Sheilds | 525/71 |
| 5,272,205 | 12/1993 | Eichenauer | 525/71 |
| 5,274,032 | 12/1993 | Eichenauer | 525/71 |
| 5,302,663 | 4/1994 | Eichenauer | 525/71 |
| 5,302,664 | 4/1994 | Eichenauer | 525/71 |
| 5,631,323 | 5/1997 | Guntherberg | 525/71 |

FOREIGN PATENT DOCUMENTS

| | | |
|---|---|---|
| 534212 | 3/1993 | European Pat. Off. . |
| 1124911 | 1/1966 | United Kingdom . |

*Primary Examiner*—Paul R. Michl
*Attorney, Agent, or Firm*—Joseph C. Gil; Aron Preis

[57] ABSTRACT

A thermoplastic molding composition which features improved impact and reduced opacity is disclosed. The composition which contains (A) 2 to 59 percent of a first grafted rubber having a weight average particle size of 0.05 to 0.30 microns, and (B) 6 to 56 percent of a second grafted rubber having a weight average particle size of 0.31 to 1.00 microns, and (C) 35 to 75 percent of a copolymeric matrix. The total rubber content of the composition is 10 to 40 percent relative to the total weight of (A), (B) and (C). The grafted rubber, both occurrences, contains a grafted phase and a core-shell phase. The grafted phase contains a styrenic copolymer and the core-shell phase, both occurrences, contains a core containing at least one crosslinked vinylaromatic polymer, and an elastomeric shell. The copolymeric matrix (C) contains a styrenic copolymer.

10 Claims, No Drawings

WEATHERABLE RESINOUS COMPOSITION HAVING IMPROVED OPACITY AND IMPACT STRENGTH

The invention concerns a thermoplastic molding composition and more particularly a composition which contains grafted rubber having a bimodal size distribution.

SUMMARY OF THE INVENTION

A thermoplastic molding composition which features improved impact and reduced opacity is disclosed. The composition which contains (A) 2 to 59 percent of a first grafted rubber having a weight average particle size of 0.05 to 0.30 microns and (B) 6 to 56 percent of a second grafted rubber having a weight average particle size of 0.31 to 1.00 microns and (C) 35 to 75 percent of a copolymeric matrix. The total rubber content of the composition is 10 to 40 percent relative to the total weight of (A), (B) and (C). The grafted rubber, both occurrences, contains a grafted phase and a core-shell phase. The grafted phase contains a styrenic copolymer and the core-shell phase, both occurrences, contains a core containing at least one crosslinked vinylaromatic polymer, and an elastomeric shell. The copolymeric matrix (C) contains a styrenic copolymer.

BACKGROUND OF THE INVENTION

It has long been known that thermoplastically processable styrene/acrylonitrile copolymers (SAN) may be imparted improved impact properties by the incorporation of rubbers. In ABS polymers, diene polymers are used as the rubbers for toughening, most notably at low temperatures; however, the relatively poor weathering and aging resistance make these materials less favored in more demanding applications. In some such applications, use has successfully been made of crosslinked acrylic acid ester polymers; these are the well known ASA copolymers. Such have been described in U.S. Pat. No. 3,055,859 and in German 1,260,135 and 1,911,882. Accordingly, the preferably crosslinked, rubbery acrylic acid ester polymer which serves as the grafting base (substrate) is first prepared by emulsion polymerization and the latex thus prepared is then grafted, preferably by emulsion, with a mixture of styrene and acrylonitrile. The art thus has long been recognized that improved impact strength, notched Izod, greater hardness and reduced shrinkage are associated with such ASA products which have as a grafting base a coarse polyacrylate latex having a mean particle diameter of about 150 to 800 nm and a narrow particle size distribution. Also, noted in the present context is the disclosure in U.S. Pat. No. 4,224,419 which disclosed an ASA based composition which contains two different graft copolymers of SAN onto crosslinked acrylates, and a hard copolymeric SAN component.

The art refers to "hard" and "soft" segments in terms of the relative position of their glass transition temperature vis a vis room temperature. "Hard" means $T_g$ above room temperature and "soft" means below room temperature, as well as to core/shell structures including structures which contain a multiplicity of shells. Multi-phase structured emulsion copolymers, including hard-soft and hard morphologies have been disclosed in EP 534,212 and in the documents referenced therein. Accordingly, graft copolymers with a hard core of polystyrene, a first butyl acrylate shell and an outer SAN shell have been disclosed in the art. Significantly, the '212 document disclosed a monomodal system containing particles having a styrene core and measuring less than 0.2 microns. Also presently relevant is a copending patent application, Ser. No. 08/955,857 which concerns a corresponding composition containing a monomodal size distribution of a grafted rubber phase.

DETAILED DESCRIPTION OF THE INVENTION

The inventive thermoplastic composition comprises:

(A) 2 to 59, preferably 8 to 41, percent of a first grafted rubber having a weight average particle size of 0.05 to 0.30, preferably 0.10 to 0.25 microns, and (B) 6 to 56, preferably 7 to 36, percent of a second grafted rubber having a weight average particle size of 0.31 to 1.00, preferably 0.32 to 0.60 microns, and (C) 35 to 75, preferably 50 to 70, percent of a copolymeric matrix, is characterized in that its total rubber content is 10 to 40, preferably 20 to 30 percent relative to the total weight of (A), (B) and (C).

The grafted rubber, in both components (A) and (B), contains a grafted phase and a core-shell phase the weight ratio therebetween ranges from 0.3 to 1, preferably 0.5 to 0.9. The grafted phase contains a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate. The weight ratio between said monomer(s) of said first group to said monomer(s) of said second group ranges between 80:20 to about 65:35.

The core-shell phase, both occurrences, contains (a) about 2 to 40, preferably 5 to 30, % relative to the weight of said core-shell phase, of a core containing at least one, preferably crosslinked, vinylaromatic polymer, and (b) about 60 to 98, preferably 70 to 95, % relative to the weight of said core-shell phase, of a shell containing the crosslinked polymerization product of at least one member selected from the group consisting of $C_{2-8}$-alkyl acrylate, vinyl acetate, hydrogenated diene and diene.

The copolymeric matrix (C) contains a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate. The weight ratio between said monomer(s) of said first group to said monomer(s) of said second group ranges from 80:20 to about 65:35.

The composition according to the invention may contain conventional additives, in customary and effective amounts, which are known for their utility in thermoplastic elastomeric molding compositions.

The grafted rubbers, components (A) and (B) of the inventive composition, may be prepared by graft copolymerization of at least one of styrene, α-methyl styrene, ring halogenated styrene, ring-alkylated styrene, such as p-methylstyrene and tert butylstyrene with at least one of (meth)acrylonitrile and methylmethacrylate in the presence of the core-shell substrate. Since 100% grafting yield cannot be achieved in the graft copolymerization, the polymerization product from the graft copolymerization always contains a proportion of free, non-grafted copolymer (for convenience, the grafted phase is referred to hereinafter in this text as SAN). However, for the purposes of the present invention, the term "grafted rubber" is only applied to the rubber to which SAN have actually been grafted. The proportion of the grafted SAN in the polymerization product from the graft copolymerization can be determined in the conventional manner by extracting the free, non-grafted SAN copolymer from the polymerization product, for example by methyl ethyl ketone. The principles of the method of separation have been described by Moore, Moyer and Frazer, Appl. Polymer Symposia No. 7, page 67 et seq. (1968).

The degree of grafting, in the present context, refers to the percentage proportion, based on the total graft rubber, of the SAN which is chemically bonded in the grafting branches of the graft copolymer. The degree of grafting may be calculated from the analytically determined composition of the gel which is insoluble in methyl ethyl ketone.

The particle size according to the invention is the weight-average particle size as determined by an ultracentrifuge, such as in accordance with the method of W. Scholtan and H. Lange, Kolloid-Z. und Z.-Polymere 250 (1972), 782–796. The ultracentrifuge measurement gives the integral mass distribution of the particle diameters of a sample. From this it is possible to determine that the percentage by weight of the particles have a diameter equal to or less than a certain size.

The graft rubber useful according to the invention, namely components (A) and (B), may be prepared in the conventional manner by methods which are well known in the art. The preferably crosslinked core phase, in both components (A) and (B), may be prepared by conventional emulsion techniques which are well known in the art. The monomers to be employed are at least one member selected from the group consisting of styrene, α-methyl styrene, ring-halogenated styrene and ring-alkylated styrene, such as p-methylstyrene and tert.butylstyrene. Crosslinking may be attained by the incorporation of small amounts, usually about 0.5 to 10%, preferably 0.5 to 3%, relative to the weight of the core, of any of the polyfunctional monomeric crosslinking agents, which are well known in the art. Examples include tri allyl cyanurate, di allyl maleate and di vinyl benzene.

The shell in both components (A) and (B) contains the crosslinked polymerization product of at least one member selected from the group consisting of $C_{2-8}$-alkyl acrylate, vinyl acetate, hydrogenated diene and diene.

In the preferred embodiment, the shell contains an acrylic acid ester polymer having a glass transition temperature of below 0° C. Preferably, this temperature should be below −20° C., more particularly below −30° C. The glass transition temperature of the polymer making up the shell may be determined by the DC method (K. H. Illers, Makromol. Chemie 127 (1969), page 1). Suitable alkyl acrylates for the preparation of acrylic acid ester polymers are those where the alkyl has 2 to 8 carbon atoms, most preferably these the alkyl has 4 to 8 carbon atoms. Specific examples are n-butyl acrylate and ethylhexyl acrylate. The acrylic acid esters may be employed as individual compounds or as mixtures with one another. In the preparation of the core-shell phases, the monomers making up the shell are polymerized in the presence of the previously prepared core polymer.

In order to obtain crosslinking of the preferred acrylic polymers, the polymerization is preferably carried out in the presence of from 0.5 to 10% by weight, preferably from 0.5 to 3% by weight, based on the total monomers employed for the preparation of the grafting bases, of a copolymerizable, polyfunctional, preferably trifunctional, monomer which effects crosslinking and subsequent grafting. Suitable bifunctional or polyfunctional crosslinking monomers are those which contain two or more, preferably three, ethylenic double bonds which are capable of copolymerization and are not conjugated in the 1,3-positions. Examples of suitable crosslinking monomers are divinylbenzene, diallyl maleate, diallyl fumarate and diallyl phthalate, triallyl cyanurate and triallyl isocyanurate. Grafting agents may optionally be included, including unsaturated monomers having epoxy, hydroxy, carboxyl, amino or acid anhydride groups, for example hydroxyalkyl (meth)acrylates.

The preparation of the grafted rubbers, (A) and (B) to be employed according to the invention may be carried out in accordance with the following method. The preferably crosslinked vinyl aromatic core is first prepared by polymerizing the vinyl aromatic monomer(s) in aqueous emulsion by conventional methods at from 20 to 100° C., preferably from 50 to 90° C. The conventional emulsifiers, for example alkali metal salts of alkyl sulfonic acids or alkyl aryl sulfonic acids, alkyl sulfates, fatty alcohol sulfonates, salts of higher fatty acids of 10 to 30 carbon atoms, or rosin soaps, may be used. The sodium salts of alkyl sulfonic acids or the sodium salts of fatty acids of from 10 to 18 carbon atoms are preferred. Advantageously, the emulsifier is used in an amount of from 0 to 5% by weight, especially from 0 to 2% by weight, based on the monomer(s) employed to prepare the core polymer. In general, a water:monomer ratio of from 50:1 to 0.7:1 is used. The polymerization initiators used are in particular the conventional persulfates, e.g., potassium persulfate, but redox systems can also be employed. In general, the initiator is used in an amount of from 0.1 to 1% by weight, based on the monomer(s) employed in the preparation of the core. Further polymerization additives which may be employed are the conventional buffers, to bring the pH to about 6 to 9, for example sodium bicarbonate and sodium pyrophosphate, and from 0 to 3% by weight of a molecular weight regulator, for example a mercaptan, terpinol, or dimeric α-methyl styrene.

The precise polymerization conditions, such as the nature, rate of addition, and amount of the emulsifier initiator, and other additives, are selected, within the ranges referred to above so that the resulting latex of the preferably crosslinked vinyl aromatic core polymer attains the indicated particle size. The particle size distribution of the particles making up the core in each of (A) and in (B) is monomodal. In the inventive composition, the particles of (A) and (B) conform to a bimodal size distribution.

The crosslinked elastomeric (rubber) shell is preferably prepared by polymerizing at least one member selected from the group consisting of $C_{2-8}$-alkyl acrylates and butadienes in the known emulsion polymerization process in the presence of the previously prepared core latex as described above. The elastomeric shell amounts to about 60 to 98, preferably 70 to 95 percent relative to the total weight of the core-shell phase. A conventional aqueous emulsion polymerization process at temperatures of about 20 to 100 C., preferably 50 to 90 C. may be used and may be a continuation of the polymerization of the aromatic core or, in the alternative, may be carried out separately. Added emulsifiers, initiators, buffers and molecular weight regulators useful in the preparation of the core are useful and may be used in the stated amounts in the process for the preparation of the shell. The crosslinking agents used in the making of the core are, in the above stated amounts, useful in preparing the crosslinked shell. Examples of such crosslinking agents are compounds having more than one non-conjugated double bond such as tri-allyl cyanurate, di-allyl maleate, di-vinyl benzene, ethylene glycol di-(meth) acrylate and butylene glycol di-methacrylate. Typically, these are used in mounts of about 0.1 to 10%, preferably 0.5 to 3% relative to the wight of the monomers used to prepare the elastomeric shell.

To prepare the grafted rubber of components (A) and (B), a monomer system containing at least one monomer selected from a first group consisting of styrene, α-methyl styrene, ring-alkylated styrene, such as p-methylstyrene and tert.butylstyrene with at least one monomer selected from a second group consisting of (meth)acrylonitrile and methylmethacrylate (herein "SAN") is polymerized in the presence of the latex of crosslinked rubber, preferably acrylic acid ester polymer which contains about 1 to 25 percent relative to its weight of a polymer of vinyl aromatic monomer, preferably, styrene (core). The weight ratio between the monomer of said first group to said monomer of said second group is 80:20 to about 65:35.

It is advantageous if this graft copolymerization of the grafted phase onto the crosslinked rubber substrate is carried out in aqueous emulsion under the conventional conditions. The graft copolymerization may advantageously be carried out in the same system as the emulsion polymerization which is used to prepare the substrate, optionally with the further addition of emulsifier and initiator. The monomer system to be grafted onto the base, can be added to the reaction mixture all at once, in several stages or, preferably, continuously during the polymerization. The graft copolymerization of the mixture onto the crosslinked rubber substrate is conducted such that a degree of grafting of 10 to 50% by weight, preferably 20 to 40% by weight, in the grafted rubbers (A) and (B), results. Since the grafting yield of the graft copolymerization is not 100%, it is necessary to employ a somewhat larger amount of the monomer mixture for the graft copolymerization than would correspond to the desired degree of grafting. The control of the grafting yield of the graft copolymerization, and hence the degree of grafting of the finished grafted rubbers (A) and (B), is familiar to the art-skilled and is effected, inter alia, by the rate of addition of the monomers and by adding a molecular chain regulator (Chauvel and Daniel, ACS Polymer Preprints 15 (1974), 329 et seq.). The emulsion graft copolymerization in general produces about 10 to 25% by weight, based on the graft rubber, of free, non-grafted copolymer. The proportion of the grafted rubber in the polymerization product obtained from the graft copolymerization is determined in accordance with the method specified above.

The grafted phase in the grafted rubbers (A) and (B), along with the non-grafted (free) polymer produced in the emulsion polymerization is recovered as dry solids from the liquid latex by the usual coagulation, washing, dewatering and drying techniques.

As discussed above, the composition in accordance with the invention contains a copolymeric matrix (C) which includes a copolymer of at least one monomer selected from a first group consisting of styrene, α-methyl styrene, ring-halogenated styrene and ring-alkylated styrene and at least one monomer selected from a second group consisting of (meth)acrylo-nitrile, and methyl methacrylate. The weight ratio between said monomer(s) of said first group to said monomer(s) of said second group is 80:20 to about 65:35. The free, non-grafted copolymer formed during the graft copolymerization for the preparation of the components (A) and (B), may also form part of the hard component (C). Depending on the conditions selected for the graft copolymerization to prepare the grafted rubber component (A) and (B), it may be that a sufficient proportion of hard component (C) has already been formed during the graft copolymerization. In general, however, it is necessary to mix the products obtained from the graft copolymerization with additional, separately prepared hard component (C).

This additional, separately prepared hard component (C) is preferably a styrene/acrylonitrile copolymer, an α-methyl styrene/acrylonitrile copolymer or an α-methyl styrene/styrene/acrylonitrile terpolymer. These copolymers can be employed individually, or as mixtures with one another, as the hard component, so that the additional separately prepared hard component (C) of the composition according to the invention can, for example, be a mixture of a styrene/acrylonitrile copolymer and an α-methyl styrene/acrylonitrile copolymer. The hard component (C) may be obtained by conventional methods. Thus, the copolymerization of styrene and/or α-methyl styrene with acrylonitrile can be carried out by radical polymerization preferably mass polymerization, solution polymerization, suspension polymerization or aqueous emulsion polymerization. Preferably, the hard component (C) has a weight average molecular weight of about 50 to 250, preferably 80 to 150 Kg/mole.

The mixing of the components for the preparation of the inventive composition may be carried out conventionally by method and using equipment which are well known in the art. For instance, if the components have, for example, been prepared by emulsion polymerization, it is possible to mix the resulting polymer dispersions with one another, then to coprecipitate the polymers, and to work up the polymer mixture. Preferably, however, components (A), (B) and (C) may be mixed by conjointly extruding, kneading or milling them, in which case the components must necessarily first be isolated from the solution or aqueous dispersion obtained by polymerization.

The composition may contain, as further components, any additive conventionally used, such as fillers, other compatible plastics, antistatic agents, antioxidants, flameproofing agents and lubricants. The additives may be used in conventional effective amounts, preferably of from 0.1 to a total of about 30% relative to the total weight of A+B+C.

The examples which follow illustrate the invention. In the examples, parts and percentages are by weight, unless stated otherwise.

EXAMPLES

The notched impact strength of the compositions was determined by the method of DIN 53,453 on injection-molded standard small bars at 23° C. These bars were injection molded at 250° C. or 280° C.

Experimental

Compositions representative of the invention have been prepared and their properties determined. The results of the determinations are shown in the table below. In the preparation of the compositions the components were 61 percent by weight of component (C) and a total of 39 percent of components (A) and (B). The individual components used in the examples were as follows:

Component (A): a first rubber having a monomodal size distribution and a weight average particle size of 0.18 microns (small mode) comprising a grafted core-shell; the content of AN is the grafted S/AN was 32% relative to the weight of the grafted phase; the number average and weight average molecular weights of the S/AN were, respectively, 54 Kg/mole and 118 Kg/mole. The amount of styrene as core, in the core-shell structure, was 30 percent, and the content of the butyl acrylate shell was 70 percent relative to the weight of the core-shell structure.

Component (B): a second rubber having a monomodal size distribution and a weight average particle size of 0.4 microns (large mode) comprising a grafted core-shell; the content of AN is the grafted S/AN was 32% relative to the weight of the grafted phase; the number average and weight average molecular weights of the S/AN were, respectively, 54 Kg/mole and 118 Kg/mole. The amount of styrenic core and the corresponding butyl acrylate rubber in the core-shell structure varied as noted in the table below.

Component (C): a copolymeric matrix of S/AN where the content of AN is 32% relative to the weight of the copolymer and where the number average and weight average molecular weights of the S/AN were, respectively, 54 Kg/mole and 118 Kg/mole.

In comparative Example 1 the grafted rubbers where in all respects identical to Components A and B except that none contained the styrenic core. These components are noted in the table as $A_{ns}$ and $B_{ns}$ respectively.

In comparative example 2, only the large mode grafted rubber contained no styrenic core.

In all formulations, the rubber content was 25% relative to the weight of the composition.

| Example | Comp.1 | Comp.2 | 1 | 2 | 3 | 4 |
| --- | --- | --- | --- | --- | --- | --- |
| Component A, wt % | 0 | 24.6 | 24.6 | 24.6 | 24.6 | 24.6 |
| Component B, wt % | 0 | 0 | 14.4 | 14.4 | 14.4 | 14.4 |
| Component C, wt % | 61 | 61 | 61 | 61 | 61 | 61 |
| Component $A_{ns}$, wt % | 24.6 | 0 | 0 | 0 | 0 | 0 |
| Component $B_{ns}$ wt % | 14.4 | 14.4 | 0 | 0 | 0 | 0 |
| styrene content in the small mode rubber, % | 0 | 30 | 30 | 30 | 30 | 30 |
| styrene content in the large mode rubber, % | 0 | 0 | 5 | 10 | 20 | 30 |
| MMP[i], psi | 725 | 699 | 682 | 682 | 682 | 638 |
| opacity[ii] | 99.2 | 96.4 | 95.1 | 94.8 | 94.0 | 92.8 |
| Impact properties Izod, at 23 C, J/m 1/8" | 138 | 106 | 181 | 163 | 138 | 107 |
| multiaxial impact[iv],J @ room temperature | | | | | | |
| $E_m$ | 21 | 23 | 22 | 22 | 21 | 22 |
| $E_f$ | 36 | 37 | 38 | 37 | 35 | 36 |

[i]MMP = minimum molding pressure
[ii]Determined by contrast ratio as explained below
[iv]determined in accordance with ASTM D 3763; $E_m$ denotes energy at maximum; $E_f$ denotes energy to failure.

The minimum molding pressure at the melt temperature of about 255° C. is indicative of the flow of the composition. The data points to the critical dependence of flow on the styrene content of the substrate. The Opacity was determined by the contrast ratio. The contrast ratio (CR) is a measure of opacity and is determined on a molded specimen measuring 3×4×0.1 inch. The determination entails measuring the reflectance first against a black background and again against a white background using a spectrophotometer (Applied Color System; using Illuminant D65 at a 10 degree observer angle). The Y-tristimulus values are calculated based on the three instrument-measured CIE (International Commission on Illumination) L*, a* and b* values. The contrast ratio (CR) is determined as $$CR = 100 \times Y_{(against\ black)} / Y_{(against\ white)}$$

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising (A) 2 to 59 percent of a first grafted rubber having a weight average particle size of 0.05 to 0.30 microns and (B) 6 to 56 percent of a second grafted rubber having a weight average particle size of 0.31 to 1.00 microns and (C) 35 to 75 percent of a copolymeric matrix, wherein total rubber content is 10 to 40 percent relative to the total weight of (A), (B) and (C) and wherein said grafted rubber, both occurrences, contains a grafted phase and a core-shell phase the weight ratio therebetween ranges from 0.3 to 1, and wherein said grafted phase contains a copolymer of at least one monomer selected from a first group consisting of styrene, α-methyl styrene, ring-halogenated styrene and ring-alkylated styrene and at least one monomer selected from a second group consisting of (meth) acrylonitrile and methyl methacrylate, wherein weight ratio between said monomer of said first group and said monomer of said second group is about 80:20 to about 65:35 and wherein said core-shell phase, both occurrences, contains (a) about 2 to 40% relative to the weight of said core-shell phase, of a core containing at least one vinylaromatic polymer, and (b) about 60 to 98% relative to the weight of said core-shell phase, of a shell containing the crosslinked polymerization product of at least one member selected from the group consisting of $C_{2-8}$-alkyl acrylate, vinyl acetate, hydrogenated diene and diene, said copolymeric matrix (C) containing a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate where weight ratio between said monomer of said first group to said monomer of said second group ranges from 80:20 to about 65:35.

2. The composition of claim 1 wherein said (A) is present in an amount of 8 to 41 percent.

3. The composition of claim 1 wherein said (B) is present in an amount of 7 to 36 percent.

4. The composition of claim 1 wherein said (A) has a weight average particle size of 0.10 to 0.25 microns.

5. The composition of claim 1 wherein said (B) has a weight average particle size of 0.32 to 0.60 microns.

6. The composition of claim 1 wherein said (C) is present in an amount of 50 to 70 percent.

7. The composition of claim 1 wherein total rubber content is 20 to 30 percent relative to the total weight of (A), (B) and (C).

8. The composition of claim 1 wherein said grafted phase and core shell phase, in both components (A) and (B), relate by weight one to the other in the range of 0.5 to 0.9.

9. The composition of claim 1 wherein said core-shell phase, both occurrences, contains 5 to 30% relative to the weight of said core-shell phase, of a core containing at least one vinylaromatic polymer, and 70 to 95%, relative to the weight of said core-shell phase, of a shell containing the crosslinked polymerization product of at least one member selected from the group consisting of $C_{2-8}$-alkyl acrylate, vinyl acetate, hydrogenated diene and diene.

10. A thermoplastic molding composition comprising (A) 5 to 25 percent of a first grafted rubber having a weight average particle size of 0.10 to 0.25 microns, and (B) 7 to 36 percent of a second grafted rubber having a weight average particle size of 0.32 to 0.60 microns, and (C) 50 to 70 percent of a copolymeric matrix, characterized in that its total rubber content is 20 to 30 percent relative to the total weight of (A), (B) and (C) and wherein said grafted rubber, both occurrences, contains a grafted phase and a core-shell phase the weight ratio therebetween ranges from 0.5 to 0.9, and wherein said grafted phase contains a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate, wherein weight ratio between said monomer of said first group and said monomer of said second group is about 80:20 to about 65:35 and wherein said core-shell phase, both occurrences, contains (a) about 5 to 30% relative to the weight of said core-shell phase, of a core containing at least one vinylaromatic polymer, and (b) about 70 to 95% relative to the weight of said core-shell phase, of a shell containing the crosslinked polymerization product of at least one member selected from the group consisting of $C_{2-8}$-alkyl acrylate, vinyl acetate, hydrogenated diene and diene, said copolymeric matrix (C) containing a copolymer of at least one monomer selected from a first group consisting of styrene, α-methyl styrene, ring-halogenated styrene and ring-alkylated styrene and at least one monomer selected from a second group consisting of (meth)acrylonitrile and methyl methacrylate where weight ratio between said monomer of said first group to said monomer of said second group ranges from 80:20 to about 65:35.

* * * * *